Oct. 30, 1934.   J. VOSS ET AL   1,978,774
ARTIFICIAL SAUSAGE CASING AND A PROCESS OF PREPARING IT
Filed Feb. 21, 1933
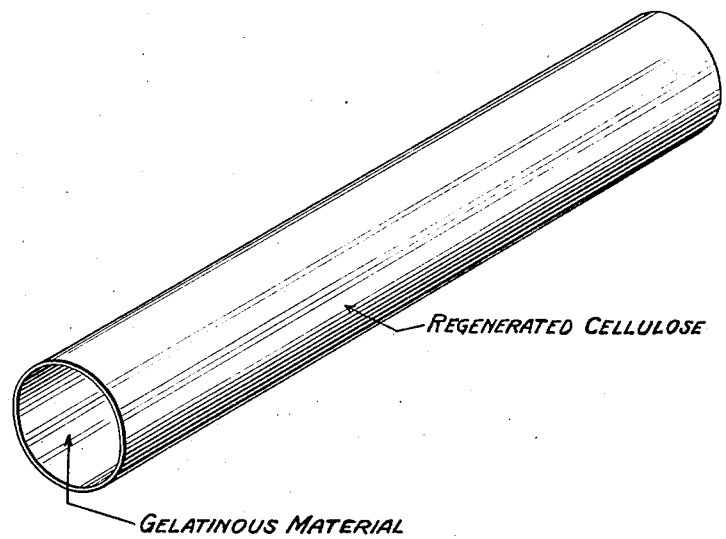
Inventors
Julius Voss and
Oswald Würges Patented Oct. 30, 1934

1,978,774

UNITED STATES PATENT OFFICE 1,978,774

ARTIFICIAL SAUSAGE CASING AND A PROCESS OF PREPARING IT

Julius Voss and Oswald Würges, Wiesbaden-Biebrich, Germany, assignors to The Visking Corporation, Chicago, Ill., a corporation of Virginia Application February 21, 1933, Serial No. 657,790 In Germany February 24, 1932

16 Claims. (Cl. 17—45)

The present invention relates to artificial sausage casings and to a process of preparing them.

It is known to use tubular bodies made of regenerated cellulose as sausage casings. These casings have well proved for preparing Bologna sausage, liver-sausages and other kinds of sausages, which are consumed soon after their preparation. Hitherto, it has, however, been difficult to prepare sausages that keep well in tubular bodies made of regenerated cellulose, because the casing separates when stored for a prolonged time from the sausage mass and the whole becomes unsightly. Furthermore a process for preparing sausage casings is known, wherein a tissue made from silk or the like is impregnated with meat material or wherein the meat material is applied from the outside of the tissue in the form of a powder. The sausage casings so obtained were likewise not adopted in practice for preparing sausages that keep well, because the casings consisting of silk or a similar material have no shrinking power and because the outer coating with meat material does not close tightly and is liable to be damaged owing to its brittleness.

According to this invention all these drawbacks are avoided and a casing for sausages that will suffice all demands can be prepared by coating the inner side of a tubular body made of regenerated cellulose or a water-sensitive cellulose derivative with a layer of a material which is capable of swelling in water and adheres to the meat as well as to the tubular body employed. As material for this layer there is preferably employed gelatine of various degrees of hardness. Furthermore solutions or extracts from animal or vegetable materials containing a gelatinous substance are suitable, as for instance an extract from rinds of bacon and the like. For the same purpose there have furthermore proved to be suitable: albumin, casein, vegetable mucilages, isinglass, water-soluble cellulose derivatives which are colloidally soluble, as for instance methyl cellulose, furthermore viscous kinds of gum and so on. These substances are applied on the inner walls of the casings in form of a solution, especially an aqueous solution. In some cases it may be advantageous to subject the layers thus obtained to a hardening process. This can be effected, for instance, by adding a hardening agent to the said solution or by hardening the applied layer before or after the drying process.

The invention is illustrated in the accompanying drawing in which an artificial sausage casing is shown in perspective. In the illustration a short section of regenerated cellulose is shown lined with gelatinous material.

As casings all tubular bodies may be used, which have been prepared from regenerated cellulose or from water-sensitive cellulose derivatives, either by cementing a foil from these materials or by seamless spinning of a suitable solution from an annular nozzle or by coating a round dipping form with the cellulose mass. The impregnation of the tubular bodies on the inner wall can take place before or after the drying of the tubular bodies. Furthermore, tubular bodies made from cellulose or cellulose derivatives can be used which have been steamed as described in German Patent No. 416,796, dated June 2, 1923, in the name of Société Industrielle pour l'Application de Brevets et Procédés. It is advisable to add a softening agent to the layer of the binding agent applied to the inner wall of the tubular bodies, thus protecting the layer from damage in dry weather. The thickness of this layer may be very small, because it does not serve for the solidification of the tubular bodies; generally, a thickness of the layer of about 0.02 mm. has proved to be sufficient.

Such a coating can, for instance, be produced by filling a dried tubular body made from regenerated cellulose with a hot solution of 250 grams of gelatine, 40 grams of glycerine in 710 cc. of water, then squeezing the solution out of the tubular body, so that only a thin layer adheres on the inner wall of the said tubular body and finally drying the tubular body while inflating it.

Instead of the above named gelatine solution there can also be utilized a solution of 200 grams of gelatine in 800 cc. of water, to which 25 cc. of a 3 per cent. formaldehyde solution have been added. When the latter treatment is carried out in the manner above described a tubular body is obtained, the inner wall of which possesses a gelatine layer of greater degree of hardness than in the example described in the previous paragraph. Instead of adding the hardening agent, such as formaldehyde, tannin, alum, chromium salt or the like to the gelatine or other material to be hardened, the tubular body can also be filled, as described above, with an unhardened gelatine layer, and subsequently be passed through a bath, for instance a glycerine bath to which the hardening materials have been added. According to the relative quantity of the gelatinous and hardening materials employed, a layer is obtained showing the most varied degrees of hardness.

The material thus prepared from regenerated cellulose or water-sensitive cellulose derivatives has well turned out in practice. Over the known materials it has the advantage of a high solidity also in a wet state. Furthermore, on account of its completely closed surface it does not allow the atmosphere, in contrast to the casings made from tissue, to reach the meat materials at any place, thus protecting the casing in a complete manner. Finally, the sausage casing has a good shrinking power and adheres to the meat material, also in a moist atmosphere.

The casings provided with a layer of a binding agent are stuffed in the usual manner. The usual further treatments during the preparation of meat, such as drying and smoking, are in no way disturbed by the binding agent.

By "water-sensitive derivatives" as used herein is meant cellulose derivatives which are hygroscopic, i. e., will be wet by water and swelled by it as distinguished from cellulose acetate and the like, which are water-resistant. Regenerated cellulose is the preferred water-sensitive cellulose derivative.

We claim:

1. A sausage casing of a water-sensitive cellulose derivative bearing on the inner walls a coating of a material capable of swelling with water and of setting with the said walls and the sausage-meat.

2. A sausage casing of regenerated cellulose bearing on the inner walls a coating of a material capable of swelling with water and of setting with the said walls and the sausage-meat.

3. A sausage casing of a water-sensitive cellulose derivative bearing on the inner walls a coating of a gelatinous material capable of swelling with water and of setting with the said walls and the sausage-meat.

4. A sausage casing of a water-sensitive cellulose derivative bearing on the inner walls a hardened coating of a gelatinous material capable of swelling with water and of setting with the said walls and the sausage-meat.

5. A sausage casing of regenerated cellulose bearing on the inner walls a coating of a gelatinous material capable of swelling with water and of setting with the said walls and the sausage-meat.

6. A sausage casing of regenerated cellulose bearing on the inner walls a hardened coating of a gelatinous material capable of swelling with water and of setting with the said walls and the sausage-meat.

7. A sausage casing of regenerated cellulose bearing on the inner walls a hardened coating of a gelatinous material of animal origin capable of swelling with water and of setting with the said walls and the sausage-meat.

8. A sausage casing of regenerated cellulose bearing on the inner walls a hardened coating of gelatine.

9. The method of preparing a sausage casing from a cellulose tubular body which comprises coating the inner walls of the body with a layer of a material capable of swelling with water and firmly attaching itself to said wall and to the sausage meat.

10. The method of preparing a sausage casing from a cellulose tubular body which comprises coating the inner walls of the body with a layer of a material capable of swelling with water and firmly attaching itself to said wall and to the sausage meat, and subjecting the layer thus obtained to a hardening process.

11. The method as set forth in claim 9 in which said swelling agent is gelatin.

12. The method as set forth in claim 9 in which said tubular body is composed of regenerated cellulose and in which said swelling agent is gelatin.

13. The method as set forth in claim 9 in which said swelling agent is animal gelatin.

14. The method as set forth in claim 9 in which said cellulose body is a water-sensitive cellulose derivative.

15. The process of preparing sausage casings from a tubular body of a water-sensitive cellulose derivative which comprises filling said body with a solution of a material capable of swelling with water and of affixing itself to said wall and to the sausage meat, squeezing the walls of the tubular body, and then drying the latter and inflating it with air.

16. The method as set forth in claim 15 in which said solution contains a hardening agent for said swelling material.

JULIUS VOSS.
OSWALD WÜRGES.